United States Patent [19]
Welland

[11] 3,827,299
[45] Aug. 6, 1974

[54] ELECTRICAL FLOW-METERS

[75] Inventor: John Michael Welland, Helmel Hempstead, England

[73] Assignee: Perkin Elmer Limited, Beaconsfield, Buckinghamshire, England

[22] Filed: June 9, 1972

[21] Appl. No.: 261,445

[30] Foreign Application Priority Data
June 9, 1971  Great Britain .................. 19596/71

[52] U.S. Cl. ............................................. 73/204
[51] Int. Cl. ........................................... G01f 1/00
[58] Field of Search .................................. 73/204

[56] References Cited
UNITED STATES PATENTS
3,187,569  6/1965  Los ....................................... 73/204
3,229,522  1/1966  Benson ................................. 73/204

Primary Examiner—Herbert Goldstein
Attorney, Agent, or Firm—Edward R. Hyde, Jr.; Francis L. Masselle

[57] ABSTRACT

An electrical fluid flow-meter of the type in which the flow rate is measured by means of a uniformly heated thin-walled measuring tube of good thermal conductivity having at each of its ends a member acting as a heat sink. To avoid the non-linearity or distortion in readout of previous flow-meters at high flow rates, a single primary heating and sensing device surrounding a substantial length first portion of the tube immediately downstream of the upstream end of the tube is used which responds to the temperature gradient changes at the upstream end of the measuring tube when a fluid flows through the tube. The downstream end of the primary heating and sensing device is immediately followed by a compensating heating means to maintain this downstream end of the sensor at a constant temperature level even for the highest flow rates which the flow-meter is designed to measure. This isolates the sensor from the temperature gradient near the downstream end of the measuring tube, which is not symmetrical to the gradient near the upstream end of the tube at relatively high flow rates, thereby yielding an almost perfectly linear output of the sensor relative to the flow rate being measured.

10 Claims, 10 Drawing Figures

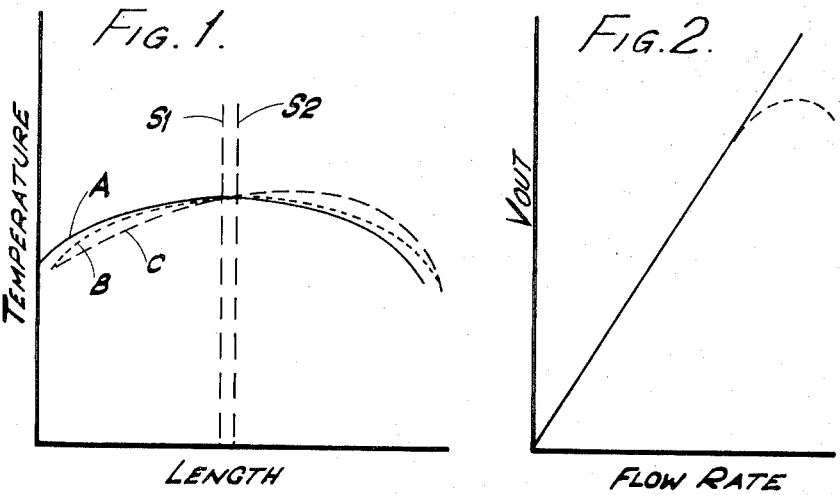
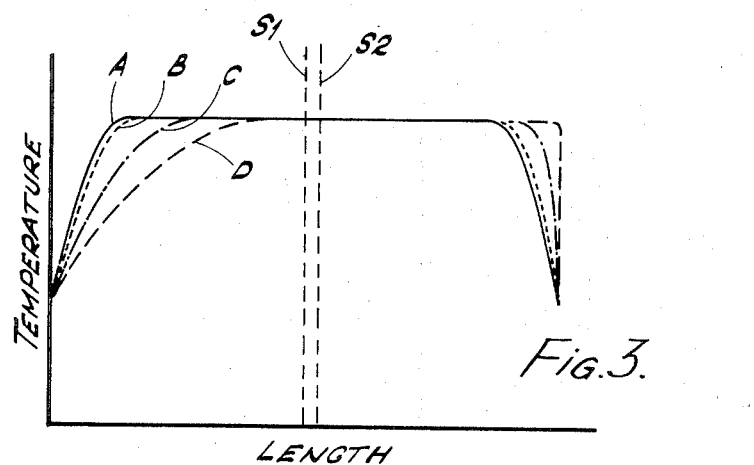
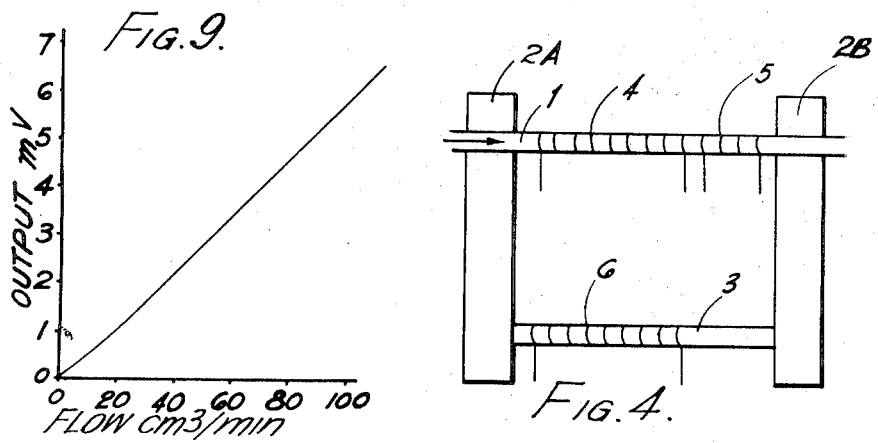

ELECTRICAL FLOW-METERS

This invention relates to electrical devices and systems for measuring the flow rate of a fluid. In particular it concerns meters for measuring gas flow rates within the ranges prevailing, for example, in gas chromatography. Such devices and systems are hereinafter referred to as electrical flowmeters.

Known electrical flowmeters include a type comprising a thin-walled measuring tube of good thermal conductivity, supported at each end in a metal block acting as a heat sink. The tube is uniformly heated, e.g. by passing an electric current along its length, so that when no fluid is flowing through the tube, there is established a particular transverse plane at an intermediate position between the two blocks. This plane, which is perpendicular to the longitudinal axis of the elongated tube, divides the tube into two parts having symmetrical heat distribution, and therefore may be aptly termed a "plane of thermal symmetry." In particular, the temperature gradient near the upstream block is matched by the symmetrical (mirror image) gradient at the downstream block. When there is a non-zero fluid flow, the plane of thermal symmetry is shifted toward the downstream block since heat is pumped in the direction of the fluid flow. This shift in said plane can be detected and measured by means of a pair of temperature sensors, one upstream and one downstream of the original position of said plane. The relative amplitudes of the outputs of these temperature sensors are a known function of the fluid flow rate; thus these sensor outputs may be utilized to determine the rate of fluid flow.

Unfortunately, an electrical flowmeter of the above type has a response which is reasonably linear only over a comparatively small range of flow rates. If a wider linear range is required, as is very often the case, then complex linearizing circuits must be employed; and this detracts from the inherent simplicity and reliability of the device.

I have discovered that the principal reason for the short linear range in electrical flow-meters of the known type referred to above is as follows. When the flow rate exceeds a certain value, the heat transfer from the upstream to the downstream half of the measuring tube (which up to said certain value has merely caused a shift in the plane of thermal symmetry) actually begins to impair the symmetry itself.

As noted above, the uniform heating of the measuring tube (which tube must necessarily be thin enough to allow a substantial temperature gradient to occur along its length when there is a significant velocity of fluid flow) causes the entire tube to be at a substantially single temperature over its entire length when the fluid flow velocity approaches zero. However I have now found that for even relatively moderate flow rates, the end or terminal portions of the tube (that is, those portions near the metal blocks acting as heat sinks) experience a strong temperature gradient, rather than a very low or near zero gradient (i.e., substantially constant temperature along their length) as has heretofore been supposed.

When fluid flow occurs, the temperature gradient at the upstream tube end varies through a comparatively large range of values. On the other hand the downstream gradient can merely approach a maximum value (i.e., a vertical line on a graph) at higher flow rates; and since it is always a steep curve or line even at relatively low flow rates, this downstream gradient can only vary over a comparatively small range of values (that is from being a steep gradient (i.e., high valued) to being an even steeper or substantially vertical one). Thus at flow rates higher than a particular value, the relative change of the downstream part of the tube (as measured by the temperature sensor) to the overall output signal of the flow-meter becomes relatively constant, and this results in severe non-linearity in this output signal. In other words, the function of the combined outputs of the upstream and downstream sensors is only roughly proportionate to the flow rate for quite low fluid flow rates. At higher fluid flow rates the output of the upstream sensor still varies in a very approximately proportional manner according to the flow rate, while the output of the downstream sensor remains substantially constant (and high); therefore the combined function of these two outputs is no longer even roughly proportionate to the actual fluid flow rate being measured. Thus the flow-meter becomes severely non-linear and inaccurate at relatively high flow rates.

It is true that by increasing the wall thickness of the measuring tube, the above-described effect can be lessened; but for the improvement in range of linearity to be significantly increased, the tube must be made of such relative thickness that an excessive sacrifice in sensitivity, speed of response and range results.

The present invention overcomes the linearity problem while actually extending the range and without sacrificing speed of response. For this purpose primary heating means is provided to heat up uniformly an upstream portion of the measuring tube length. A temperature sensor is arranged all round the heated upstream portion and its downstream end is maintained at a substantially constant datum temperature (the terms "constant datum temperature" and "datum temperature" and the like are used hereinafter to refer to a particular constant temperature level) for all flow rates within the design range by a compensating heating means energized independently of the primary heating means and positioned around the tube as if to prolongate the sensor in a downstream direction. In this arrangement, the sensor responds to the flow-induced cooling progressively extending from its upstream to its downstream end and is not affected by the distortion of thermal symmetry as between upstream and downstream temperature gradients, as in the case of the prior art device, because the downstream end of the sensor is clamped at a datum temperature.

According to the present invention there is provided an electrical flowmeter of the type referred to, comprising a thin-walled longitudinally extending measuring tube with thermally equalized ends, temperature sensing means and primary heating means, either separate or joint, coextensive with an upstream portion of the tube length from a position close to the upstream end thereof and compensating heating means coextensive with a downstream portion of the tube length immediately following said upstream portion.

According to a more specific aspect of the present invention there is provided an electrical flowmeter of the type referred to, comprising a thin-walled longitudinally extending measuring tube mounted at each end in a heat sink, a temperature sensing and primary heating winding forming a uniform layer of closely coiled turns around an upstream portion of the tube length from a start near the upstream heat sink, a compensating heating winding forming a uniform layer of closely coiled turns around a downstream portion of the tube length immediately following said upstream portion, means for enabling the heating and sensing winding to be connected to a measuring circuit, and means for enabling the compensating heating winding to be connected to a source of electrical power.

By making the wall of the tube sufficiently thin, say, only 2 or 3 thousands of an inch, said upstream portion can be heated uniformly up to a point very close to said upstream heat sink and the whole of the temperature sensing means can be made to experience a practically uniform temperature for the whole of its length under zero flow conditions. When flow commences heat will be dumped in the downstream direction and as the rate is increased more and more of said temperature sensing means will be subjected to a flow-induced cooling. The limit of the range is reached when almost, but not quite, the whole of said temperature sensing means experiences the cooling effect of flow. In fact, for good linearity it is desirable to restrict the range to a value well below the limiting value.

It is clear, therefore, that the length of the upstream portion of the measuring tube to which the sensing function is confined is determined by the required flow range, provided that for a given overall length of tube the downstream portion remaining is sufficient for the compensating function to be performed. The transfer of compensating heat to the tube is governed by the parameters of the compensating heating means and the heating current fed into it. Since uniform heating is aided by maintaining approximately the same current in the primary heating means and the compensating heating means, the compensating heating means should first be made to extend over a sufficient length of the downstream portion to achieve or nearly achieve the desired linearization. Final adjustment can then be made by regulating the heating current. This operation is not at all critical and even comparatively gross overcompensation would have in the main no more serious effect than restricting the flowmeter range.

If a standard length of measuring tube is used in flowmeters covering different ranges, the upstream portion need not be of a greater length than the particular range requires, otherwise the signal-to-noise ratio will suffer unnecessarily. This naturally means that if the range is particularly short the downstream portion will be much longer than the upstream portion and only a small length of it will be covered by the compensating heating means, the latter varying little from flowmeter to flowmeter.

A specific form of temperature sensing and primary heating means other than that of the winding referred to above (separate windings for sensing and heating could be used as an alternative, if desired) is a continuous conductive layer disposed upon the measuring tube, an intervening electrically insulating but thermally conducting film enabling the heating current to pass through the layer, from one to other longitudinal end, without being shunted by the measuring tube, which would normally be made of a suitable metal. Separate superimposed and insulated layers may be used to separate the heating and the sensing functions. A single insulated layer may be used for the compensating heating means.

The invention will now be described by way of example with reference to the accompanying diagrammatic drawings wherein:

FIG. 1 depicts the hereto assumed temperature distribution along the measuring tube of a prior art electrical flowmeter of the type hereinbefore defined;

FIG. 2 is a plot of the hitherto expected output voltage against flow rate for the said prior art flowmeter;

FIG. 3 represents the temperature distribution which has in fact been found to exist along the measuring tube of said prior art flowmeter for conditions of no flow, small flow, medium flow and large flow, respectively;

FIG. 4 is an embodiment in accordance with the present invention;

FIG. 9 is a plot of bridge output in a millivolts against gas flow rate in $cm^3$/minute for either of the two measuring channels of FIG. 8;

Figure 5:
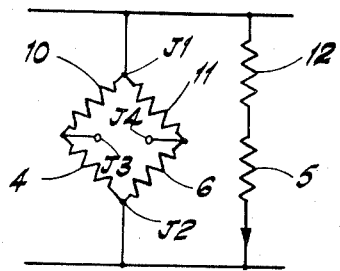
FIG. 5 is a general utilization circuit for the embodiment of FIG. 4.

It was thought hitherto that the heat distribution along the measuring tube of a known electrical flowmeter of the general type defined in the introduction to this specification conformed to curves A to C, shown in FIG. 1, for conditions of no flow, small flow and large flow, respectively. Curve A is divided into two symmetrical parts by the plane of thermal symmetry S1 bisecting the length of the measuring tube. When a small flow is set up through the tube, the thermal symmetry is not disturbed and the plane simply shifts to S2. Under conditions of large flow, the thermal symmetry is impaired. FIG. 2 is a plot of flowmeter output voltage against flow rate, from which it will be observed that the impairment of thermal symmetry under large flow conditions leads to non-linearity in the flowmeter output, as shown by the dotted line.

We have discovered that the above performance normally attributed to the prior art flowmeter is very optimistic. Curves A to D in FIG. 3 are a more realistic representation for conditions of no flow, small flow, medium flow and large flow, respectively. Note how steep are the flanks of Curve A. As a small flow is set up (Curve B), the plane of thermal symmetry shifts from S1 to S2 with no significant distortion in symmetry. Symmetry is already significantly distorted with a moderate further increase in flow (Curve C), and it is no longer even remotely present with large flow rates (Curve D).

FIG. 3 clearly suggests the reason for the severe non-linearity of the prior art flowmeter for all but small flow rates. The steep gradient at the upstream end of the measuring tube can become smaller and smaller through a wide range of values as the flow increases but the gradient at the downstream end cannot become much steeper without closely approaching the vertical. This means that beyond a small value of flow rate the downstream temperature sensor of the prior art senses less and less of the flow-induced temperature changes, with the result that its percentage contribution to the overall sensitivity falls off as the rate of flow increases.

FIG. 4 depicts diagrammatically an embodiment of the present invention providing an electrical flowmeter with an extended linear range. The extremities of a thin-walled stainless steel measuring tube 1 are embedded in massive heat sinks represented by end blocks 2A and 2B, made of brass. The ends of an identical tube 3 are also embedded in blocks 2A and 2B. Tube 3 is sealed at both ends and acts as a reference. Tube 1 is open ended, of course, to enable a flow to be set up therethrough.

A dual-function primary heating and sensing winding 4 is disposed in a single layer of closely coiled turns upon an upstream portion of the tube 1 equal to approximately two thirds of the overall tube length. A shorter but otherwise similar winding 5 representing a compensating heating winding is disposed upon a downstream portion of the remaining approximate one third of the tube, the first turn of winding 5 commencing close to where the last turn of winding 4 ends. Reference tube 3 carries a reference winding 6 which is electrically and geometrically the exact equivalent of winding 4. The portion of tube 3 corresponding to the downstream portion of tube 1 is left free.

It will be noted that a small gap is left between the upstream block 2A and the start of winding 4. This is to prevent the initial turns of the winding 4 from experiencing the steep temperature gradient existing in very close proximity to the block 2A when the tube 1 is heated by winding 4. For good linearity, all turns of the winding 4 should be subjected to the same constant or datum temperature under static conditions. As a small flow is set up through tube 1 a few initial turns begin to experience the cooling effect of flow, the temperature of successive turns tapering up to the datum value. Increasing the flow gradually increases the number of turns between the first, i.e., the coolest, and the one which is nearly at datum level, with the result that the electrical output of the flowmeter rises linearly with flow.

The effect of the compensating heating winding 5 is to maintain the temperature of a few terminal turns of winding 4 near datum level even when the highest flow rate in the design range has been set up through tube 1. These terminal turns may be regarded as inactive and their number is naturally determined by the amount of compensating heat supplied through the compensating heating means 5.

FIG. 5 broadly illustrates the manner in which the device of FIG. 4 is inserted in a utilization circuit. It will be seen that the heating and sensing winding 4 and the reference winding 6 form adjacent arms of a Wheatstone bridge, of which resistors 10 and 11 form the opposite pair of adjacent arms. A DC bridge supply is established across junctions J1 and J2 and the bridge output may be picked up across the remaining junctions J3 and J4. The compensating heating winding 5 in series with variable resistor 12 is fed from the DC bridge supply.

The arms of the bridge are closely matched so that under no flow conditions the arms have very nearly the same resistance value. Furthermore, the resistance of the compensating heating winding 5 and the resistance range of the variable resistor 12 are so chosen in relation to the series resistance of resistor 10 and winding 4 that a satisfactory compensating action can be achieved while approximately the same current is flowing through the windings 4 and 5. The object of all this is to ensure that the heating function performed by the heating and sensing winding 4 over approximately two thirds of the measuring tube length is taken over by the compensating heating winding 5 over an adequate part of the remaining one third without any temperature gradient being set up in the transition zone of the tube underlying the terminal turns of winding 4 and the initial turns of winding 5.

The terminal turns of winding 5 will experience a steep gradient, of course, but since winding 5 does not form part of the measuring circuit the gradient will not affect the linearity of the output across J3 and J4. It will now be clearly appreciated that the compensating winding 5 must comprise a sufficient number of turns to ensure that the steep temperature gradient at the downstream end thereof is sufficiently removed from the terminal turns of winding 4. This is tantamount to saying that a sufficient number of initial turns in winding 5 should experience no significant temperature gradients so that they can act as buffers for winding 4.

Resistor 12 in FIG. 5 need not be variable because there is normally no need to alter it once the value has been found that will give a compensating current enabling the desired linearity characteristics to be obtained.

Figure 6:
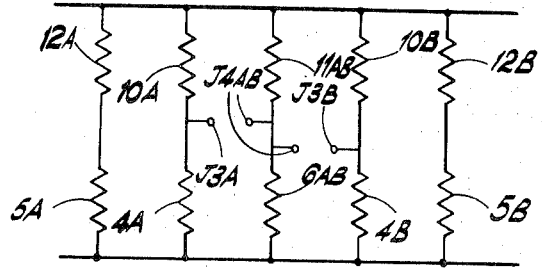
FIG. 6 is a general utilization circuit for the embodiment of FIG. 4 modified by the addition of a second measuring tube.

FIG. 6 is a slight modification of FIG. 5 which enables two flow channels, e.g. two chromatographic channels, to be compared against a single reference. It will be seen that the flowmeter arrangement depicted comprises two Wheatstone bridges sharing a pair of adjacent arms, heating and sensing winding 4A, resistor 10A, reference winding 6AB, and resistor 11AB forming the left-hand bridge, the output of which is available across J3A and J4AB, and heating and sensing winding 4B, resistor 10B, reference winding 6AB, and resistor 11AB forming the right-hand bridge providing an output across J3B and J4AB. The left-hand bridge co-operates with compensating winding 5A and resistor 12A, and the right-hand bridge co-operates with their respective counterparts 5B and 12B.

Figure 7:
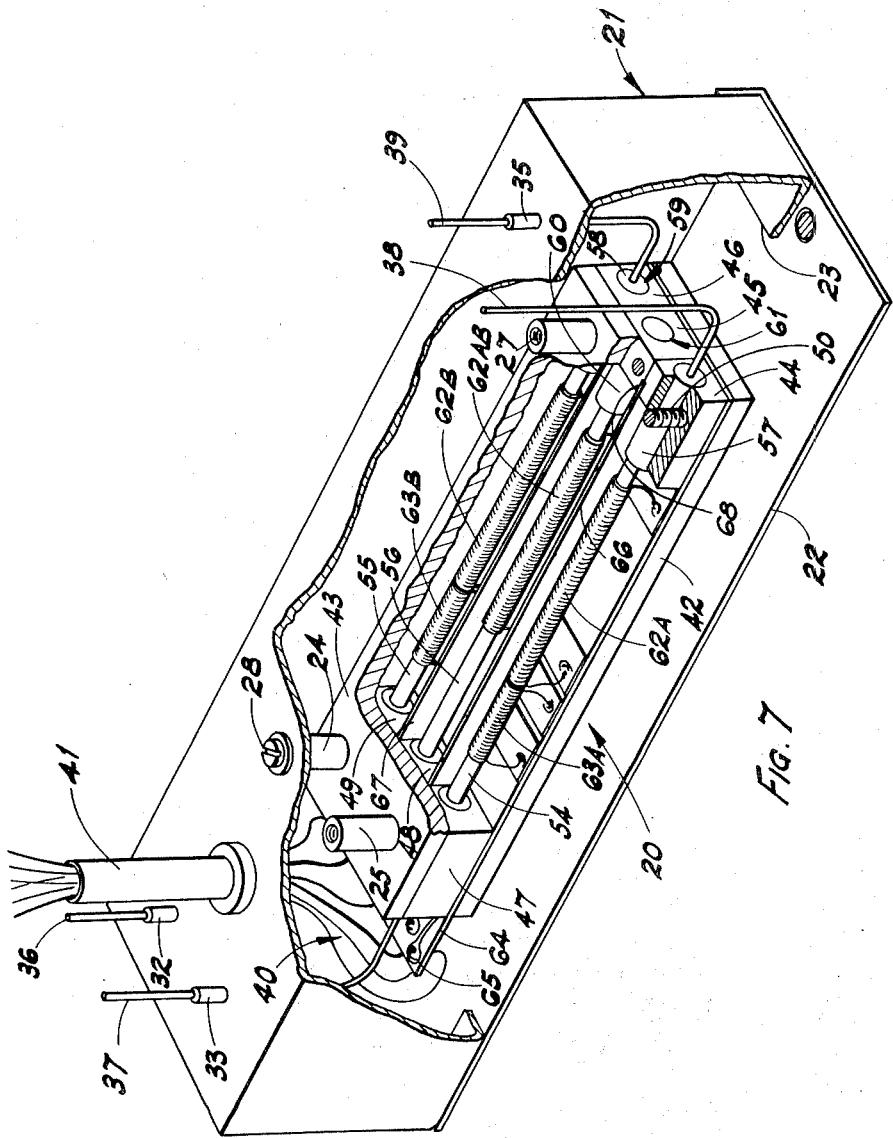
FIG. 7 is a practical realization of an electrical flowmeter in accordance with the present invention, incorporating two measuring channels and a single reference.

FIG. 7 is a practical embodiment of a flowmeter having two measuring channels and intended for measuring chromatographic flow rates in a double-column gas chromatograph. The flowmeter comprises the unit generally referred to at 20 enclosed in a longitudinally extending parallelopipedal metal box 21, the bottom longitudinal wall of which is represented by a cover plate 22, forming an air-tight seal with an inward lip 23 of the box 21. The unit 20 is supported within the box 21 by pillars 24 to 27 (26 not shown) made of synthetic-resin bonded fabric, abutting against the top wall of the box 21 and co-operating with screws 28 to 31 (29 to 31 not shown) which terminate approximately half way through the threaded bore of respective pillars 24 to 27.

An air spacing is provided all around unit 20 and the heat path through solid material is in the main confined to the four pillars 24 to 27 (26 not shown) made of synthetic-resin bonded fabric, which are of course very poor heat conductors. Plastic bushes 32 to 35 (34 not shown) prevent direct contact between the small-bore gas tubes 36 to 39 and the box 21. Heat leakage to box 21 through the electrical leads 40 is small and the insulating bush 41 helps in minimizing it. The object of box 21 and of the manner in which the unit 20 is mounted therein is to ensure that any temperature differentials impressed upon unit 20 by ambient temperature gradients are attenuated as much as possible, at least to the point where they can be regarded as negligible compared with the flow-induced temperature differentials on which the operation of the present flowmeter must rely. It is of course important to maintain a draught-proof environment for the unit 20. Box 21, sealed to cover plate 22, effectively provides this.

Unit 20 comprises a lower brass plate 42, an upper brass plate 43 and, sandwiched between the two plates, brass blocks 44 to 46 acting as upstream heat sinks, and brass blocks 47 to 49 acting as downstream heat sinks. Screw 50, which passes through lower brass plate 42, block 44 and upper brass plate 43, together with three other corresponding screws 51 to 53 (not shown) at the corners of unit 20 serve to keep the sandwich together after engaging the pillars 24 to 27, made of synthetic-resin bonded fabric, which are internally threaded. There are two additional clamping screws (not shown) acting in similar manner and passing through blocks 45 and 48, respectively. These other screws co-operate with nuts (not shown) abutting against upper plate 43 in the same manner of pillars 24 to 27 made of synthetic-resin bonded fabric.

Stainless steel tube 54 spanning blocks 44 and 47 represents the measuring tube of one flowmeter measuring channel and identical tube 55 is its counterpart in the second measuring channel. The intermediate tube 56 identical with tubes 54 and 55 is the reference tube. It will be observed that each tube is provided with its own pair of terminal heat sinks and that when unit 20 is fully assembled as shown all the upstream heat sinks 44 to 46 are paralleled, mainly by the upper brass plate 43, to form a heat sink block. Similarly for the downstream heat sinks. The main reason why the tubes are terminated by their own heat sinks is that manufacture, assembly and accurate matching of the three sections comprising the two measuring channels and the reference are all made much more convenient.

Tube 54 is brazed into one end of a short thick-walled adaptor tube 57 accommodated within a bore in block 44. To the outer end of adaptor 57 there is brazed the gas tube 38, of stainless g steel, through which the associated chromatographic column effluent is passed to tube 54. Similarly for adaptor tube 58 in bore 59 of block 46, adaptor tube 58 being brazed to tube 55 of the second measuring channel at one end and to gas tube 39 at the other end. An adaptor tube 60, in a bore 61 of block 45 is brazed to reference tube 56 at the inner end and is sealed off at the outer end. The construction of the upstream part just described is repeated symmetrically at the downstream end.

A sensing and heating winding of insulated copper wire 62A is formed in a single layer of closely wound turns on tube 54, starting a few millimetres from the adaptor 57. Where winding 62 terminates, a separate compensating winding 63A takes over without intervening air gap. The spacing between the downstream end of winding 63A and the adaptor symmetrical to adaptor 57 is about one centimetre.

A circuit board 64 clamped between the terminal heat sinks and the lower plate 42 is provided with terminations to which are soldered the end of windings 62A and 63A. The windings are held fast to the tube 54 by means of a suitable cement. Conductors formed in the circuit board 64 extend the four winding terminations to soldering posts such as 65 to which the leads 40 are joined.

The measuring channel associated with tube 55 and windings 62B and 63B is electrically and mechanically identical with the measuring channel associated with the tube 54 and windings 62A and 62B.

The reference section of unit 20, comprising reference tube 56, is also mechanically and electrically identical with the measuring channel incorporating tube 54 except that the tube 56 is sealed in the associated terminal adaptors, as referred to above, and no compensating winding is provided adjacent to reference winding 62AB.

To minimize as much as possible air movements across the three measuring tubes of the unit 20, PTFE baffles 66 and 67 are provided, one each side of reference tube 56, the baffles being end located in a groove defined by milling out the corners of two adjacent heat sink blocks, as shown for example at 68.

The essential mechanical and electrical parameters of the flowmeter depicted in FIG. 7 are given below, with reference to the measuring channel including tube 54:

TABLE 1

| Tubes 37 and 38 (and 36 and 39) | |
| --- | --- |
| Outer diameter | 1/16 in. |
| Inner diameter | 0.040 in. |
| Block 44 (and 45–49) | |
| Length | 0.5 in. |
| Width | ⅜ in. |
| Height | ¼ in. |
| Diameter of bore 37A | 3/16 in. |
| Tube 54 (and 55 and 56) | |
| Clear length between adaptors | 2½ in. |
| Outside diameter | 3/32 in. |
| Wall thickness | 0.004 in. |
| Winding 62 (A,B and AB) | |
| Diameter of wire | 1.6 mils |
| Number of turns | 450 |
| Length of tube covered | 1.5 in. |
| Total resistance | 75 ohms |
| Winding 63 (A and B) | |
| Diameter of wire | 1.6 mils |
| Number of turns | 150 |
| Length of tube covered | 0.5 in. |
| Total resistance | 25 ohms |

The flow-induced change in resistance experienced by the sensing and heating winding of either measuring channel or the reference winding in the flowmeter of FIG. 7 is typically 6 milliohms for a 1cm$^3$/minute flow. Such a small change naturally requires a bridge type measuring circuit having a very good common mode rejection for ensuring comparative insensitivity to temperature changes which are not flow-induced. This means that the two measuring channels and the reference should be mounted close together and the difference in electrical resistance between any two of the three windings performing a sensing function should be kept quite low, say, not greater than 1 percent. Thermal matching of the critical parts further contributes to the rejection, because ideally any heat conducting part having a direct bearing on the measuring performance of the system should be equally affected by spurious temperature disturbances. In practical terms, mechanical matching is a good approximation of thermal matching.

Where, as in the case of gas chromatography, very small rates of flow are quite common, one would expect to take greater precautions against thermal disturbances than in less stringent applications involving much higher rates of flow. The lower rates may require such a high measuring sensitivity that a temperature controlled environment for the flowmeter as a whole becomes highly desirable or even essential, although even in such stringent circumstances there is no need for sophisticated forms of temperature control.

Figure 8:
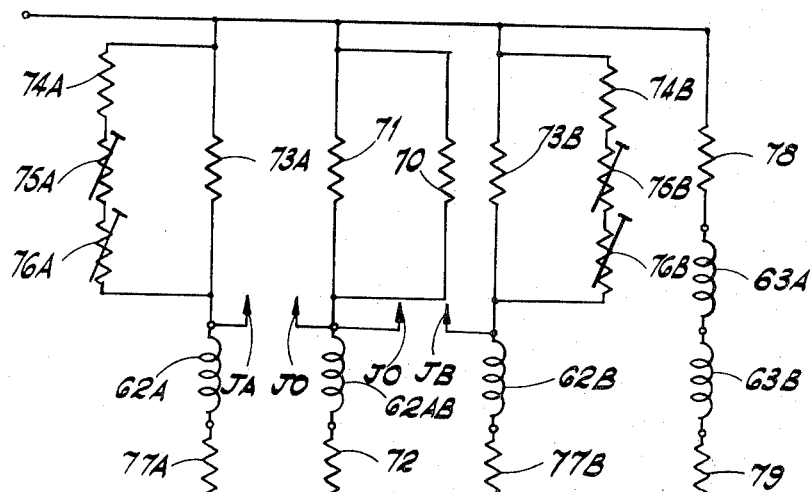
FIG. 8 is a practical utilization circuit for the embodiment of FIG. 7.

We have inserted the flowmeter of FIG. 7 in a practical measuring circuit as shown in FIG. 8. The circuit is supplied from a 4.7-Volt DC source balanced to earth, (source not shown) across which there is strung a reference chain comprising the parallel combination of resistors 70 and 71 in series with flowmeter reference winding 62AB (corresponding to the reference winding 62AB in FIG. 7) and resistor 72.

The parallel combination having resistor 73A as one branch, and resistors 74A, 75A and 76A as another branch, the two latter resistors of the pre-set kind, in series with sensing and heating winding 62A (corresponding to winding 62A in FIG. 7) an resistor 77A from a measuring chain (we shall identify it as the A measuring chain) and this too is strung across the DC supply. The A measuring chain together with the reference chain clearly constitute a bridge, the output of which is available across junctions JO, JA.

A second measuring chain (the B measuring chain) similarly co-operates with the reference chain described in defining a second bridge. It comprises resistors 73B, 74B, 75B, 76B, winding 62B and resistor 77B. The output of the second bridge is available across junctions JO and JB. The two bridges share, therefore, the reference chain.

The DC source further supplies a compensating chain comprising limiting resistor 78, compensating winding 63A (corresponding to winding 63A in FIG. 7) for co-operating with winding 62A of the A measuring chain, compensating winding 63B for co-operating with winding 62B of the B measuring chain and limiting resistor 79.

The component values of the circuit of FIG. 8 are tabulated below:

TABLE II

| | |
|---|---|
| Reference Chain | |
| Resistor 70 | 3.24K ohms |
| Resistor 71 | 130 ohms |
| Resistor 72 | 54.9 ohms |
| Reference winding 62AB as per winding 62, Table 1, Page 14. | |
| A. Measuring Chain | |
| Resistor 73A | 130 ohms |
| Resistor 74A | 2K ohms |
| Resistor 75A | 500 ohms |
| Resistor 76A | 5K ohms |
| Heating and sensing winding 62A as per winding 62, Table 1, Page 14. | |
| B. Measuring Chain | |
| Identical with A Measuring Chain | |
| Compensating Chain | |
| Resistor 78 | 73.2 ohms |
| Compensating winding 63A (and 63B) as per winding 63, Table 1, Page 14. | |
| Limiting Resistor 79 | 73.2 ohms |

To enhance sensitivity and attenuate the effect that spurious thermal dsiturbances may have on the measuring accuracy of the flowmeter, it is desirable to operate the sensing and heating winding of each measuring channel, as well as the single reference winding, at the highest current density that can be tolerated without risking a burn out. The circuit of FIG. 8 has been designed to give a heating current of about 37 milliamps, which is high enough to meet the above two requirements and still provide an adequate margin of satisfactory operation in conjunction with the other parameters of the flowmeter design.

Having decided on the value of the heating current, we should select the value of current through each of the compensating windings that translated into its heating effect will ensure the desired linearity characteristic in accordance with the hereinbefore expressed concepts. The empirical method is by far the best way of arriving at a suitable choice. Pairs of identical limiting resistors are tried until a suitable resistance value is found. This immediately takes care of a number of variables which otherwise would be difficult to calculate.

In the circuit of FIG. 8, the resistance of the two limiting resistors 78 and 79 was chosen so that in conjunction with the resistance of compensating windings 63A and 63B a current of 48 milliamps was established through the chain and FIG. 9 shows the degree of linearity achieved as the flow rate of hydrogen is increased from 0 to 100 cm$^3$/min. in, say, the A measuring channel. The output in millivolts is obtained across junctions JA and JO.

It will be observed that the response is remarkably linear and only slightly marred by a minor non-linearity at very low flow rates, around the 20 cm$^3$/min. mark. The nature of the non-linearity is such that, if desired, can be easily compensated by means of a linearizing amplifier having a number of parallel negative feedback paths each including one or more diodes. The diodes provide progressively increasing voltage thresholds so that as the signal voltage rises the feedback paths are sequentially switched in to form parallel combinations. Diodes do not switch sharply and this enables a feedback function to be generated which varies symmetrically to the gentle sweep at the bottom of the response curve. In this manner the output of the amplifier is made very nearly linear.

Figure 10:
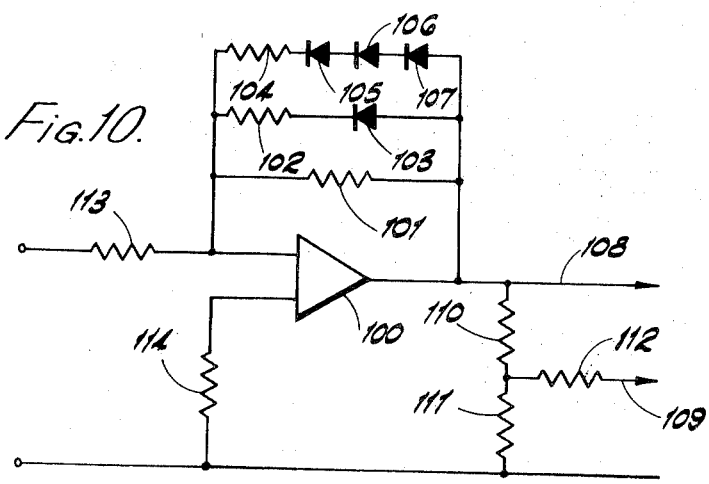
FIG. 10 is an electrical arrangement for refining the linearity of an electrical flowmeter constructed in accordance with the present invention.

Linearizing amplifiers are of course well known. A simplified diagram of the one we have used is shown in FIG. 10, wherein an amplifier 100 has a first feedback path represented by resistor 101, a second by resistor 102 and diode 103 and a third by resistor 104 and diodes 105, 106 and 107. When the signal is low only, the first path is operative. As the signal rises, the second path is added in parallel, and then a third.

The gain of the amplifier 100 is governed by the input resistor 113 in conjunction with the effective feedback impedance set up by the co-operation of the three parallel feedback paths. Resistor 114 is merely an input bias compensating resistor for ensuring in known manner that the two inputs of the differential amplifier 100 have substantially equal voltage offsets. The full output of amplifier 100 is available on line 108 for flow control purposes and an attenuated read out output is established on line 109, caused by scaling down resistors 110 to 112.

It will now be appreciated how the invention not only enables an electrical flowmeter of high intrinsic linearity to be constructed but also allows the linearity to be refined in a very simple manner because of the particular nature of the small residual non-linearity. Although an embodiment of the invention has been illustrated in the drawings and only a few modifications thereof have been mentioned in the description, other variations of apparatus embodying the invention will be obvious to those skilled in the art after seeing the preceding specifications and accompanying drawings. Therefore the invention is not intended to be restricted to any of the details contained in either the specifications or drawings; rather the patentable features are intended to be pointed out by the appended claims.

Whst is claimed is:

1. An improved electrical flow-meter comprising:
   a thin-walled measuring tube of thermally conductive material including two substantially spaced parts, one part being upstream of the other part relative to the fluid flow being measured;
   means for causing the temperature of said two tube parts to be substantially equalized;
   primary heating means and temperature sensing means at least partially surrounding a first portion of said tube which is between said parts and at least substantially adjacent to said upstream part;
   said primary heating and said temperature sensor means being in good thermal contact with said first portion;
   and compensating heating means at least partially surrounding and in good thermal contact with a second portion of said tube;
   said second portion being downstream of said first portion;
   whereby the compensating heating means causes the temperature at the downstream side of the sensing means to be maintained at a substantially constant level for all fluid flow rates within the measuring range of the particular flow-meter, as the fluid flows from the upstream to the downstream part of the tube.

2. The flow-meter as claimed in claim 1, in which:
   at least one of said heating means and said temperature sensing means are substantially integral structurally, so as to form an essentially conjoint heating and temperature sensing means.

3. The flow-meter as claimed in claim 2, in which:
   said conjoint heating and temperature sensing means comprises a single wire wound about but electrically insulated from said measuring tube.

4. The flow-meter as claimed in claim 3, in which:
   said compensating heating means comprises a compensating heating wire, which is in good thermal contact but electrically insulated from said conjoint heating and temperature sensing means.

5. The flow-meter as claimed in claim 4, in which:
   said conjoint heating and temperature sensing means and said compensating heating wire are connected in a substantially independent manner to at least one electrical source.

6. The flow-meter as claimed in claim 4, in which:
   said means for causing equalization of the temperature of said two tube parts comprise a pair of heat sinks.

7. The flow-meter as claimed in claim 6, in which:
   a small gap is provided between that heat sink associated with said upstream part and the adjacent part of said conjoint heating and temperature sensing means.

8. The flow-meter as claimed in claim 1, comprising:

a second thin-walled reference tube, similar to said measuring tube, but having a seal at both its upstream and its downstream parts at positions thereof most remote from each other, so that said reference tube is sealed substantially at its ends;
   said reference tube therefore not requiring a compensating heating means since there is not actual fluid flow therethrough.

9. The flow-meter as claimed in claim 8, in which:
   at least one additional measuring tube is provided so as to form at least one pair of measuring tubes;
   each said reference tube is operatively associated with said pair of measuring tubes, each one of said pair of measuring tubes being substantially identical to the other.

10. The flow-meter as claimed in claim 1, in which:

said thin-walled measuring tube comprises a tubular wall, the thickness of which is a small plurality of thousandths of an inch.

* * * * *